March 10, 1959 G. M. EULER ET AL 2,877,317
SWITCHING MECHANISM FOR TIMER
Filed Feb. 5, 1957 2 Sheets-Sheet 1

INVENTORS
GEORGE M. EULER,
CHARLES GRIMSHAW
BY Martin Kalikow
ATTORNEY

March 10, 1959  G. M. EULER ET AL  2,877,317
SWITCHING MECHANISM FOR TIMER
Filed Feb. 5, 1957  2 Sheets-Sheet 2
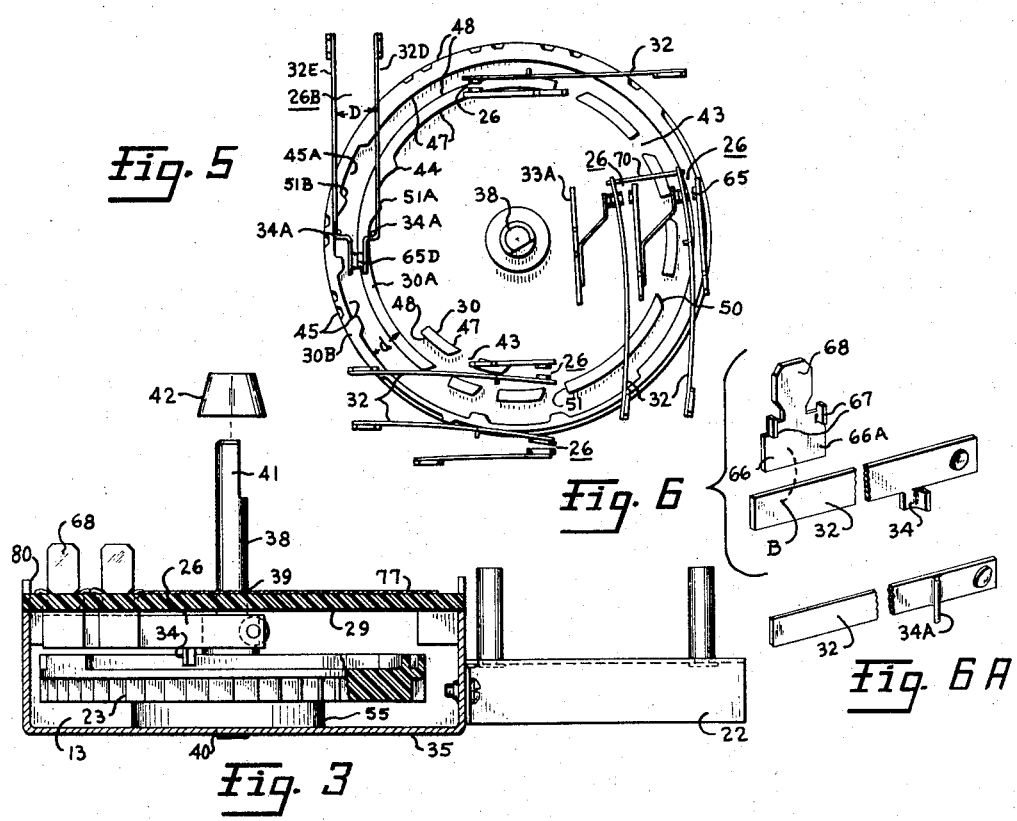
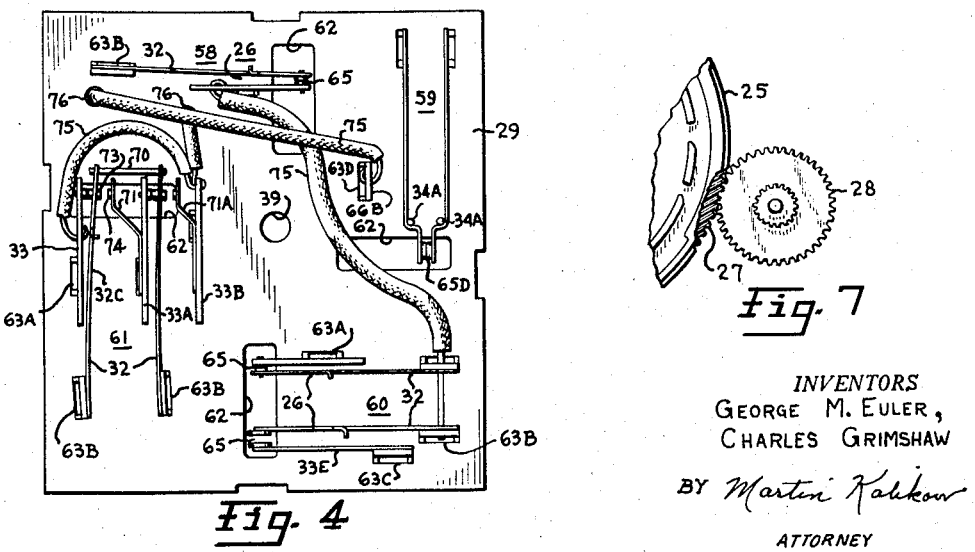
INVENTORS
GEORGE M. EULER,
CHARLES GRIMSHAW
BY Martin Kalikow
ATTORNEY 2,877,317
Patented Mar. 10, 1959

2,877,317

SWITCHING MECHANISM FOR TIMER

George M. Euler, Schenectady, N. Y., and Charles Grimshaw, Fulton, Ill., assignors to General Electric Company, a corporation of New York Application February 5, 1957, Serial No. 638,255

11 Claims. (Cl. 200—37)

Our invention relates to electric timers and more particularly to a mechanism for operating a plurality of electric switches in accord with a predetermined sequence or pattern. Timers designed to provide this type of switching operation have generally become known as "sequence timers."

Such "sequence timers" have found wide application in the control of electric appliances such as washing machines, dryers and dishwashers. As these appliances are improved, the number of electrical switches and circuits which are required increases, and the control cycle becomes more and more complicated. It is desirable however, that these sequence timers remain small and compact. The attempt to crowd these many switches and circuits into a small space raises many electrical and mechanical problems, for example, in the provision of adequate electrical clearances between switches, in the arrangement of the terminals for accessibility in making connections, and in the arrangement of the switch contacts so as to be visible by the repairman during operation of the timer control. These problems are aggravated in some applications by a requirement that the entire control cycle or a portion thereof be manually as well as electrically actuated or by a requirement that some of the switches be ganged for simultaneous operation or operate for only a very short interval of time. This crowding of many switches into a small space also aggravates manufacturing problems in the assembly of the device and in maintenance of close manufacturing tolerances.

Accordingly an important object of the invention is to provide a switching mechanism for a sequence timer capable of accommodating a great many electric switches and circuits in a small space.

Another object is to provide a switching mechanism for a sequence timer in which the arrangement and actuation of the switches is such as to permit simultaneous or independent operation of the switches in accord with any desired cyclical switching pattern with each switch operable for any desired period of time down to unusually short intervals for such apparatus, for example, less than a few seconds.

Another object of the invention is to provide a sequence timer switching mechanism which may be either manually or automatically operated throughout its control cycle or any portion thereof.

An additional object of the invention is to provide a sequence timer switching mechanism in which, despite the close spacing between the various switches, the operation of each pair of switching contacts may be observed during operation of the sequence timer control, and the terminals for each switch are arranged for easy accessibility in making connections thereto.

A further object of the invention is to provide a switch actuating mechanism for a sequence timer which can be easily manufactured to very close tolerances along the dimension employed to control switch operation and in which minor variations due to temperature or warpage have no appreciable effect upon the timing accuracy of contact gaps.

A still further object of the invention is to provide a low cost, sturdy and reliable sequence timer having unusually small size and light weight for the number of switches and circuits accommodated.

A specific feature of the invention is a switch actuating arrangement providing a slight rocking of the contacts upon engagement or disengagement thereby to give a contact cleaning or wiping action.

The novel features believed characteristic of the invention are set forth in the appended claims. The invention itself however together with further objects and advantages thereof can be easily understood by referring to the following description taken in connection with the accompanying drawing in which:

Figure 4 is a plan view of the underside of the cover for the switching mechanism of the sequence timer showing the arrangement and manner of mounting of the switches thereon;

Figure 5 is a plan view of the switches and switch actuating mechanism with the support of the switches removed in order to better illustrate the operation of the invention;

Figure 6 is a detail view of a typical switching arm and terminal preferably employed in the switching mechanism;

Figure 6A is a detail view of a modification of the switching arm of Figure 6;

Figure 7 is a plan view of a modification of the invention in which a gear drive is substituted for the impulse type drive described in connection with the other figures; and Figure 8 is a side sectional view of a modification of the invention whereby it accommodates switches on opposite sides of the switch actuating member.

Figure 2:
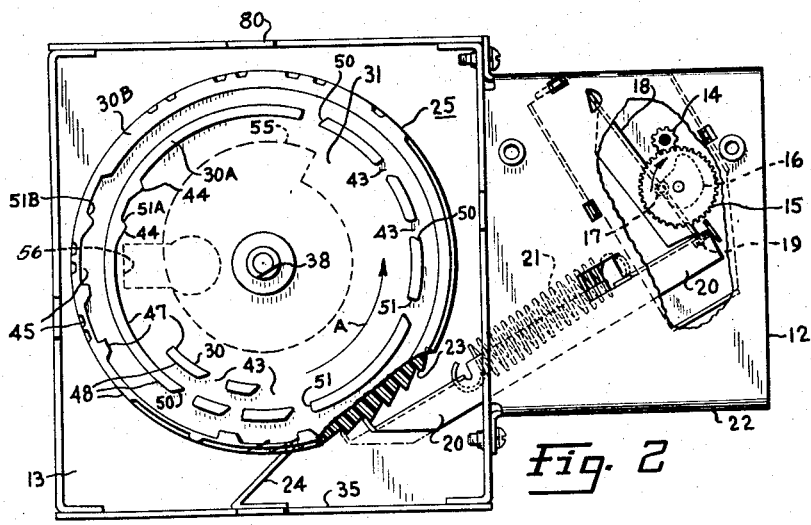
Figure 2 is a similar view of the timer of Figure 1 with the cover and motor removed and portions of the internal mechanism cut away.

Referring to the drawings, one form of the invention is shown embodied in a sequence timer 10 having a timing motor 11, an impulse type drive mechanism 12 and a switching mechanism 13. As best seen in Figure 2, motor 11 operates through its output drive pinion 14 to rotate a gear 15 to which is rigidly attached a cam 16, indicated in dashed outline in Figure 2. The rotation of cam 16 operates through a roller type cam follower 17 to move a pivoted cam follower arm 18 laterally. The lateral movement of the end 19 of cam follower arm 18 is transmitted to a ratchet arm 20 against the force of a spring 21 connected between ratchet arm 20 and the outer case 22 of the impulse drive mechanism 12. The free end of ratchet arm 20 engages ratchet teeth 23 formed in the circumference of a rotatable switch actuating member 25. The periodic lateral reciprocating motion of ratchet arm 20 under the influence of the rotation of cam 16 produces a progressive incremental rotation of switch actuating member 25 in a counterclockwise direction as indicated by arrow A. A flexible strip detent member 24 is arranged to engage teeth 23 to prevent reverse rotation thereof. Alternatively, as shown in Figure 7, switch actuating member 25 may be provided with gear teeth 27 along its outer circumference so that it may be driven continuously by the rotation of a drive gear 28 under the influence of timing motor 11.

The switching mechanism 13 is housed within a rectangular box or case 35 having a covering insulating switch supporting member or plate 29. Switch actuating member 25 cooperates with switches 26 carried by and beneath this plate 29 to perform the actual switching operations. In accord with the invention, rotatable switch actuating member 25 has a plurality of concentric arcuate narrow ridges 30, 30A, 30B (Figures 2, 5) projecting from flat portions of its upper major surface 31. The various switches 26 are arranged and supported on the plate 29 in a manner overlying these ridges. Switch actuating member 25 may conveniently be a circular disk, as shown, with arcuate ridges 30, 30A, 30B also circular. Each switch 26 contains a movable or switching arm 32 and at least one other arm 33, adjacent and preferably parallel and stationary relative to the switching arm 32. Both the switching arms 32 and the stationary arms 33 of each switch comprise thin flat strip members and are supported edgewise of surface 31 of switch actuating member 25. All of the switch arms thus lie in planes perpendicular to the general plane of the switch actuating member 25.

Figure 3:
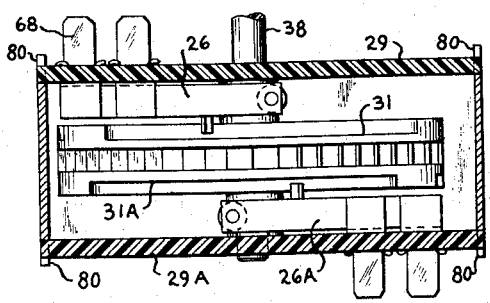
Figure 3 is a cross sectional side view of the switch actuating mechanism of the sequence timer of Figure 1.

Each switching arm 32 is preferably made of flexible electrically conductive strip material such as Phosphor bronze, and has a projection 34, best seen in Figures 3 and 6, making substantially tangential contact with an inner or outer side surface 47 or 48 of one of the arcuate ridges 30, 30A, 30B of switch actuating member 25. Projection 34 may be formed integral with switching arm 32 or may be provided by the extension of a round wire 34A (Figure 6A) welded to the switching arm 32. Each flexible switching arm 32 is bent slightly to be biased radially against this side surface of the ridge. Alternatively the switching arms 32 may be of rigid strip material and biased against the ridge by other means such as by springs. Arcuate ridges 30, 30A and 30B are arranged in concentric spaced relation to a central axle 38 representing the axis of rotation of switch actuating member 25. Axle 38 is secured to the center of switch actuating member 25 and serves to journal the switch actuating member 25 within bearing holes 39 and 40 in plate 29 and case 35 respectively. Axle 38 extends beyond plate 29 and is adapted at its end 41 to receive a knob 42 for manual rotation of switch actuating member 25.

Each of the arcuate ridges 30, 30A, 30B have at least one radial discontinuity emanating from a side surface of the ridge along its arcuate path. In ridge 30 these radial discontinuities take the form of spaces 43 between successive segments of each ridge. In ridge 30A these radial discontinuities are in the form of both spaces 43 and projections 44. In ridge 30B, however, these radial discontinuities take the form of indentations or recesses 45 extending inwardly from the opposite sides of the ridge.

It will be appreciated that the inner and outer side surfaces 47 and 48 respectively of ridges 30, 30A and 30B are preferably completely smooth and substantially perpendicular to the flat portions of front surface 31 of switch actuating member 25 from which they project. One edge 50 of each ridge side surface bordering and defining a portion of the discontinuities 43, 44 or 45 is preferably inclined at a slight angle relative to the arcuate path of the ridge to facilitate the climbing up action of the projection 34 of each switching arm 32 as it rides out of the discontinuity onto the side surface of the ridge portion. The other edge 51 of each such ridge discontinuity is preferably substantially perpendicular to the arcuate path of the ridge in order to provide a somewhat faster acting type drop-off of the switching arm 32 into the discontinuity region. In some cases, however, it has been found desirable to slope the drop-off edge slightly, as at 51A on projection 44, about 1 or 2 degrees to reduce the velocity of contact engagement thereby to decrease contact bounce and erosion particularly on high current inductive loads. The term "substantially perpendicular" is intended to cover such minor slopes away from the perpendicular.

As best shown in Figures 2 and 3, switch actuating member 25 has a spiral cam portion 55 projecting rearwardly from its central circular body portion. A key shaped hole 56 is provided in the bottom wall of case 35 overlying the spiral circumference of cam portion 55 to accommodate an operating arm (not shown) of any suitable mechanical device which may be desired to be operated by this sequence timer 10. Alternatively, as shown in Figure 8, where a great number of switches are desired to be accommodated, switch actuating member 25 may have its rear surface 31A formed in the same manner as its front surface 31 with similar arcuate concentric ridges and a rear cover plate 29A similar to front cover plate 29 carrying switches 26A similar to switches 26.

Switch actuating member 25 is composed of insulating material and is preferably a single molded plastic member. As is well known, such plastic parts may be molded with great precision especially in the circumferal dimension used to control time of operation. Since the radial dimension is used only to control contact gap, no timing error is introduced by expansion or contraction of member 25 or by minor variations in its radial dimension. Alternatively the switch actuating member 25 may be built up from three separate disk portions fastened or glued together with the central portion containing the ratchet teeth 23 made of metal rather than plastic material, if desired. It is important, however, that the arcuate ridges 30, 30A and 30B be composed of hard, long wearing insulating material capable of maintaining a smooth external surface. Materials such as mineral filled general purpose phenolic have been found unusually well suited for the front surface portion of switch actuating member 25 including the arcuate ridges 30, 30A and 30B.

Referring to Figures 1, 3, 4 and 6, the arrangement and manner of mounting of switches 26 upon the cover plate 29 will now be described. In general, as best seen in Figure 4, the various switches are arranged about the plate 29 in groups of switches such as groups 58, 59, 60 and 61. Each group preferably includes at least two switches although in the embodiment illustrated in the drawings for simplicity only one switch is shown as comprising each of groups 58 and 59. The individual switches of each group extend substantially parallel to one another and to an adjacent outer edge of plate 29. The switches of one group such as group 60, however, are located over one of the four corner portions of plate 29 and extend generally perpendicular to the switches of an adjacent group 61. Insulating plate 29 contains four moderately sized rectangular apertures 62 each located between the central hole 39 and one of the edges of plate 29 substantially perpendicular to such edge. These apertures 62 are preferably slightly offset from the center lines of the plate as shown. Insulating plate 29 is also provided with a plurality of small rectangular slots 63 for mounting the various stationary and switching contact arms of the switches. These slots are also arranged in four groups each at one corner of the rectangular plate 29 and each group directed toward one of the rectangular apertures 62 with the result that the group of slots on one side of each aperture extend in a direction perpendicular to the group on the other side of such aperture. Each group of slots preferably includes one or more slots 63A located close to the aperture 62 toward which it is directed and one or more slots 63B located more remote from the aperture 62 toward which it is directed. Slots 63B are slightly offset laterally relative to the slots 63A closer to such aperture. The stationary and switching contact arms of the various switches 26 are all mounted within respective ones of slots 63 in a manner such that their contacts 65 overlie one of the rectangular apertures 62. The switching arms 32 are mounted in the rectangular slots 63B more remote from aperture 62 to enable the use of a fairly long flexible strip for the switching arm thereby facilitating the flexure thereof. Each switching arm is mounted in its respective slot 63B by means of a rigid terminal member 66 best seen in Figure 6, which is welded to or formed integral with the end portion of switching arm 32. Minor calibration adjustment in the timing cycle of the switch can be made by slight variations in the point B that the switching arm 32 is welded to the terminal member 66. Terminal member 66 has a pair of inturned arms 67 which clamp against opposite narrow edges of the mounting slot 63B to securely fasten the switching arm 32 upon the insulating cover plate 29. After mounting, the base portion 66A of terminal 66 may be bent slightly to add to or detract from the biasing force of the switching arm against its associated ridge. Terminal member 66 also has a terminal blade portion 68 extending through and beyond the plate 29 for receiving a plug-on type of female connectors.

One important feature of the invention resulting from the construction and manner of mounting the flexible switching arm 32 lies in the slight longitudinal twisting of the arm 32 which occurs since projection 34 is offset from the supporting axis of the arm. This twisting of the switching arm produces a slight rocking of the contacts upon engagement or disengagement thereby reducing contact bounce and giving a slight wiping action to the contacts which keeps the contacts clean and inhibits welding.

Each of the stationary contact carrying arms 33 likewise has an integral terminal portion identical with terminal blade portion 68 and containing the mounting arms 67. The stationary contact arms 33 are mounted within the slots 63A located closer to the viewing aperture 62. Where it is desired to provide ganged operation between various switches the free ends of the parallel switching arms 32 of one group of switches such as group 61 are simply connected together by a rigid insulating cross bar 70.

In order to provide double pole, double throw operation for a switch 26, a supplemental contact carrying arm 71 may be attached to one of the stationary contact arms 33A and have a contact carrying portion extending close to the switching arm 32C of an adjacent switch on the opposite side thereof from its original stationary contact. The switching arm 32C is then provided with an additional contact 73 to engage a contact 74 carried by this supplementary contact arm 71. Alternatively, where the electrical circuit requires independent electrical connection, a supplemental contact arm 71A may be attached to a rigid contact carrying member 33B similar to contact arm 33 but not associated with any other switch.

Where the switch is destined to carry considerable current and a wiping action is desired, a stationary contact carrying arm 33E may be provided composed of flexible electrically conductive strip material similar to the material of switching arm 32. In this case its mounting slot 63C is preferably more remotely spaced from the viewing aperture 62 than the rigid contact arm mounting slots 63A.

Where it is desired to have the switch operate for only a short interval of time, a switch 26B may be used comprising two switching arms 32D and 32E each bearing against and actuated by a separate ridge 30A, 30B respectively on the switch actuating member 25. In this switch 26B, the contacts 65D carried by these switching arms 32D, 32E remain in engagement until the projections 34A of the switching arm 32D comes into operative alignment with projection-type radial discontinuities 44 in ridge 30A. Since both arms 32D and 32E are biased radially outward their contacts 65D do not open until the distance "D" along any radius between the inner side surface 47 of ridges 30A, 30B against which they ride exceeds the distance D between their projections 34A when contacts 65D are closed. This will occur only during the intervals when the radial discontinuities in the two ridges 30A and 30B coincide along a given radius to effect a simultaneous inward movement or position of arm 32D and an outward movement or position of arm 32E. In the embodiment illustrated, switch 26B will open when projection 34A of arm 32D moves inwardly under the influence of projection-type radial discontinuities 44 on ridge 30A at the same time that projection 34A of arm 32E moves outwardly under the influence of recess type radial discontinuity 45A on ridge 30B. It will be noted that the drop-off edge 51B of recess discontinuity 45A is located along a radius in only slight angular advance of the radius upon which the drop-off edge 51A of projection discontinuity 44 is located. Switch 26A will thus remain open during its initial operation only for the very short interval of time required for switch actuating member 25 to be rotated through the angular difference between the radial location of drop-off edge 51B and that of drop-off edge 51A. It will be appreciated that similar instantaneous operation, either opening or closing, of a switch 26B may also be accomplished by using a pair of switching arms 32D, 32E biased inwardly against the outer side surfaces of two adjacent ridges having similar coinciding radial discontinuities or by using a pair of switching arms 32D, 32E biased in opposite directions against the inner and outer side surfaces respectively of such ridges.

Internal electrical connections among the various switches may be made by conductive strips printed along the inner surface of plate 29 or by insulated wires 75 as shown. Where desired, these wires may be brought out of the device through strategically located holes 76 in the insulating plate 29. Alternatively one of the rectangular slots 63D may be used to mount a terminal member 66B to which the internal and external connections may be made.

Figure 1:
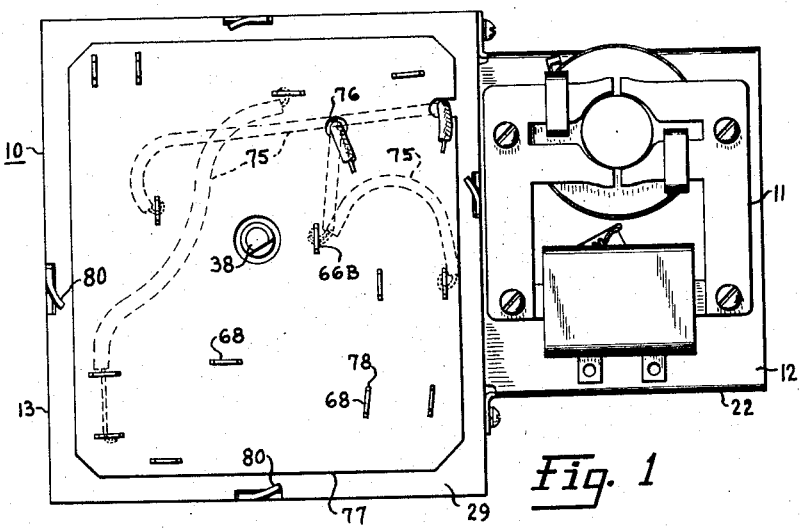
Figure 1 is a front view of a sequence timer embodying the invention.

As best seen in Figure 1, a thin insulating sheet 77 having thin slots 78 accommodating terminal blades 68 extends over the top surface of insulating plate 29 to cover the viewing apertures 62 during normal operation. However if it should be desired to view the operation of the contacts 65 of the various switches 26 this cover sheet may be easily removed.

In the assembly of the switching mechanism 13, the axle 38 of switch actuating member 25 is first inserted within central hole 39 of the insulating cover plate 29 and the various switching arms 32 of the switches 26 are flexed slightly laterally to ride against the respective side surfaces of the arcuate ridges 30, 30A and 30B. The switch actuating member 25 may then be rotated manually while observing the operation of the contacts through the viewing apertures 62. The switch actuating member 25 and cover plate 29 are then inserted within case 35 and fastened down by crimping the tangs 80 in the sides of case 35 over the cover plate 29. The insulating sheet 77 is then inserted over the terminal blades 68.

It will thus be seen that we have provided a sequence timer having a switching mechanism capable of accommodating a great number of switches in a small space and of providing operation of these switches in accord with any desired simultaneous or sequential pattern. The movement of the switch contacts may be observed during operation of the timer, groups of switches may be easily ganged for simultaneous operation, the terminals of the switches are spread apart for easy accessibility, and the switching mechanism may be actuated either manually or electrically.

Although we have described above certain specific embodiments of the invention many modifications may be made. It is to be understood therefore that we intend by the appended claims to cover all such modifications as fall within the true spirit and scope of the invention.

What we claim as new and desire to secure by Letters Patent of the United States is:

1. A time controlled switching mechanism comprising a switch actuating member having an axis of rotation and having an arcuate ridge projecting from a major surface of said member about and in spaced relation with said axis, said ridge having at least one arcuate side parallel with said axis and having at least one radial discontinuity emanating from said side, an electric motor operatively connected to said actuating member for imparting rotation thereto, a switch supporting member overlying said surface and a switch carried by said supporting member, said switch having a pair of thin flat parallel and flexible arms adjacent to each other and extending in edgewise relation to said surface, one of said arms having a projection in contact with said side of said ridge and being biased against said side for radial movement relative to said switch actuating member when said switch actuating member is rotated to bring said discontinuity into operative alignment with said projection, said arms having cooperating contacts at their one ends and being secured to said supporting member at their other ends, and said arms extending alongside each other whereby upon the radial movement of said one arm said contacts are operated with a wiping action.

2. A time controlled switching mechanism comprising a switch actuating molded disk of insulating material having arcuate ridge means projecting from a major surface of said disk in spaced relation with the axis of rotation of said disk, said ridge means having arcuate sides parallel with said axis and having at least two radial discontinuities emanating from said sides at circumferentially spaced apart points, an electric motor for rotating said disc, a plate overlying said surface, a switch having a pair of parallel thin flat arms carried by said plate extending in edgewise relation to said surface, each of said arms being flexible and having a projection biased by the resiliency of said flexible arm against a separate side of said ridge means to operate said switch by moving said arm when said dish is rotated to bring a discontinuity in the cooperating side into alignment with said projection.

3. A time controlled switching mechanism comprising a rotatable switch actuating member having a major surface of insulating material and an arcuate ridge projecting from said surface remote from the axis of rotation of said member, an electric motor for rotating said member, an insulating plate overlying said member, a thin flat switching arm and a thin flat flexible arm both fastened to said supporting plate at one end and extending parallel with and alongside one another edgewise of said member, said arms having cooperating contacts at their free ends, said switching arm being flexible and being biased radially against an arcuate side surface of said ridge, said ridge having a radial discontinuity emanating from said side surface to cause said switching arm to move radially and make electrical connection with said stationary arm with a wiping action between said contacts when said member is rotated to bring said discontinuity into operative alignment with said switching arm.

4. A time controlled switching mechanism comprising a rotatable switch actuating disk having flat surface portions and a plurality of spaced arcuate ridges projecting from said flat surface portions concentric with the axis of rotation of said disk, an electric motor for rotating said disc, a rectangular switch supporting member overlying said disk, a plurality of groups of switches secured to said member with each group extending parallel to one side edge of said member, each switch comprising a thin flat switching arm and a thin flat flexible arm both carried by said member and extending parallel with and alongside one another edgewise of said disk, said switching arms each being biased radially against an arcuate side surface of one of said ridges, each said ridge having a radial discontinuity emanating from said side surface to move the switching arm riding thereon radially for switch operation with one of said stationary arms when said disk is rotated.

5. A switching mechanism comprising a switch actuating member having an axis of rotation and a plurality of narrow arcuate ridges projecting from a major surface of said member in concentric spaced realtion with said axis, an insulating plate overlying said member and carrying at least two parallel arranged switches, each switch comprising a pair of thin flat conductive arms closely parallel to one another edgewise of said member and having contacts at their free ends aligned in a row radially of said member, at least one of said ridges having a radial discontinuity operating upon at least one of said arms to open and close said contacts upon rotation of said member, said plate having an aperture in said plate over said row of contacts.

6. A switching mechanism comprising a switch actuating disk having a central axis of rotation and an arcuate ridge projecting from a major surface of said disk in circumferal relation with said axis, a switch supporting member overlying said disk and carrying at least two parallel arranged switches, each switch comprising a pair of thin flat arms closely parallel to one another edgewise of said disk surface, one of said arms of one of said switches being movable radially relative to said disk and being biased against an arcuate side surface of said ridge, said side surface having a radial discontinuity for moving said movable arm when said disk is rotated, and a mechanical connection between said movable arm and one of the arms in said other switch.

7. A switching mechanism comprising a switch actuating disk having a central axis of rotation and a plurality of arcuate ridges projecting from a major surface of said disk in concentric spaced relation with said axis, a switch supporting member overlying said disk and carrying at least two groups of switches extending tangentially over said ridges in edgewise relation to said disk, the switches within each group being parallel to one another and one group of switches being perpendicular to the other group, said switches including switching arms bearing against the arcuate side surfaces of said ridges, said ridges having radial discontinuities for operating said switches when said disk is rotated.

8. A time controlled switching mechanism comprising a molded insulating disk supported for rotation at its center, said disk having a plurality of narrow arcuate ridges projecting from a major surface of said disk in concentric spaced relation with its axis of rotation and having a plurality of teeth around its circumference, motor driven means engaging said teeth for rotating said disk, a rectangular insulating plate overlying said disk and carrying groups of switches, each group extending parallel to one side edge of said plate, each switch comprising a pair of thin flat conductive switching arms parallel and alongside each other, at least one of said arms being biased in substantially tangential contact with an arcuate side of one of said ridges, said ridges having radial discontinuities for moving said switching arms radially for switch operation when said disk is rotated.

9. A switching mechanism comprising a molded insulating disk rotatable at its center and having a plurality of arcuate ridges projecting from the opposite major surfaces of said disk in concentric spaced relation with its axis of rotation, a pair of switch supporting plates overlying said opposite surfaces and each plate carrying a plurality of switches, each switch having a switching arm bearing against a respective arcuate side of a respective one of said ridges, said ridges having radial discontinuities for moving said switching arms radially for switch operaiton when said disk is rotated.

10. A switch actuating disc having an axis if rotation, said disc having teeth formed in its circumference for receiving a driving mechanism and having a plurality of arcuate ridges projecting from a surface of said disc in concentric spaced relationship with said axis, each said ridge having at least one arcuate side parallel to said axis and having a radial discontinuity emanating from said side for controlling the operation of a switching arm biased for radial movement against such side.

11. A switching mechanism comprising a switch actuating member having an axis of rotation and having at least two arcuate ridges projecting from a major surface of said member in concentric spaced relation with said axis, each said ridge having at least one arcuate side parallel to said axis and having a radial discontinuity emanating from said side, a switch supporting member overlying said major surface and a switch (having two switching arms), carried by said supporting member each biased for movement against one of said ridges, the radial discontinuities in each of said ridges being defined in part by side edges extending along radii only slightly angularly displaced from one another.

References Cited in the file of this patent

UNITED STATES PATENTS

| | | |
|---|---|---|
| 2,078,781 | Sprenger et al. | Apr. 27, 1937 |
| 2,391,718 | Lindemann | Dec. 25, 1945 |
| 2,647,962 | Batcheller | Aug. 4, 1953 |
| 2,703,347 | Constantine | Mar. 1, 1955 |
| 2,758,166 | Aust | Aug. 7, 1956 |
| 2,782,271 | Jordan | Feb. 19, 1957 |

FOREIGN PATENTS

| | | |
|---|---|---|
| 349,906 | France | July 27, 1905 |